A. MOSER.
ACETYLENE GAS APPARATUS.
APPLICATION FILED NOV. 4, 1912.
1,053,427.
Patented Feb. 18, 1913.
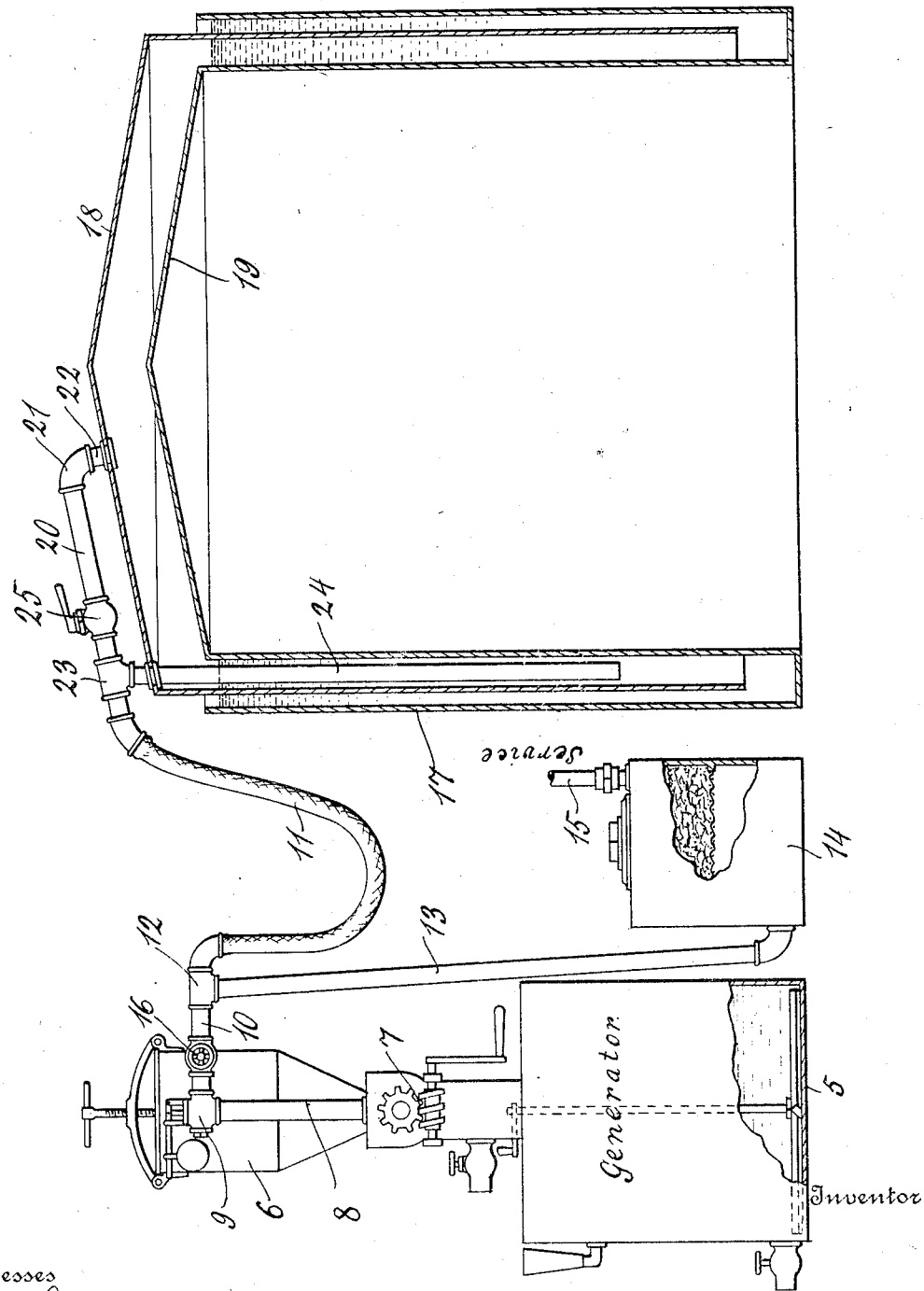

UNITED STATES PATENT OFFICE.

ANDREW MOSER, OF HICKMAN, NEBRASKA.

ACETYLENE-GAS APPARATUS.

1,053,427.

Specification of Letters Patent. Patented Feb. 18, 1913.

Application filed November 4, 1912. Serial No. 729,433.

*To all whom it may concern:*

Be it known that I, ANDREW MOSER, a citizen of the United States, residing at Hickman, in the county of Lancaster and State of Nebraska, have invented certain new and useful Improvements in Acetylene-Gas Apparatus, of which the following is a specification.

This invention relates to apparatus for generating acetylene gas, and its object is to provide a simple, safe and easily controlled apparatus of this kind which is so constructed that it may be placed on the outside of a building. A gas holder of the tank and bell type is provided, and the parts are so arranged that gas may be generated at the same time it is being used. These objects are attained by a novel combination and arrangement of parts to be hereinafter described and claimed, reference being had to the accompanying drawing in which an elevation of the apparatus, partly in section is shown.

In the drawing, 5 denotes the casing of the generator into which the carbid is fed from a holder 6, the feed device being operated by a manually actuated gearing 7. These parts may be arranged in any ordinary or preferred manner.

The gas-outlet pipe of the generator is indicated at 8. This pipe has a safety-valve 9 from which extends a pipe 10 to which is coupled a flexible hose 11 which leads to a gas holder to be presently described. The pipe 10 also contains a T-coupling 12 to which is connected a flexible hose 13 which leads to a purifier 14, and from the latter a service pipe 15 extends to the house or other place where the gas is to be used. The pipe 10, between the safety-valve 9 and the coupling 12, has a valve 16.

The gas-holder comprises an open-top tank 17 and a bell 18. The tank is annular and the space between the inner wall thereof is closed over at the top by a dome 19. The bell of the holder extends down into the space between the inner and outer walls of the tank, said space being filled with water to seal the bell. In freezing weather the sealing medium may be mixed with wood alcohol.

Above the dome of the bell 18 is located a pipe 20 which has connected at one of its ends the hose 11. To the other end of the pipe 20 is connected an elbow 21 to which is coupled a short pipe or nipple 22 which opens into the bell through the dome thereof. Intermediate its ends, the pipe 20 is provided with a T-coupling 23 to which is connected a pipe 24 which extends through the dome of the bell and down into the sealing medium between the side wall of the bell and the inner wall of the tank. The gas passes down the pipe 24 and is discharged from the lower end thereof into the sealing medium through which it rises and passes into the bell. The length of the pipe 24 is such that its lower end is still submerged in the sealing medium at the end of the upward travel of the bell, in view of which there can be no escape of gas into the atmosphere. The flexible hose 11 allows the bell to freely rise and fall without interference.

The outlet of the gas from the bell is through the nipple or pipe 22, and between the same and the gas inlet pipe 24, the pipe 20 is provided with a valve 25.

The operation of the apparatus is as follows: When the generator is working, the gas passes through the pipe 10, hose 11, and pipe 24 into the holder. The valve 25 will be closed so that the gas may pass through the sealing medium before entering the bell, as hereinbefore described. After sufficient gas has been generated, the valve 16 is closed and the valve 25 opened. The gas can now pass out of the bell through the pipe or nipple 22 and is carried by the pipe 20 to the hose 11, and from the latter it passes through the hose 13 into the purifier 14, and is discharged therefrom through the service pipe 15. The generator may also be operated while the gas is being used upon opening the valve 16, as there is no difference of pressure. This valve, when closed, shuts off the generator from the holder, and enables the former to be cleaned out.

The apparatus herein described can be placed on the outside of the building so that the parts are readily accessible, and there will be no need of using a light to examine the same, in view of which all danger of an explosion is done away with. There are no complicated parts to get out of order, and there is no danger of the apparatus running out of gas, as the position of the apparatus enables the owner to readily see how much gas is in the holder, the position of the bell indicating this. When the bell is low, the generator can be at once started, and this may be safely done while the gas is being used.

I claim:

1. In an acetylene gas apparatus, a generator, a gas-holder of the tank and bell type, a pipe having an outlet connection with the bell of the holder, and said pipe having a branch extending into the holder and into the sealing medium thereof, a valve in the first-mentioned pipe between the outlet connection and the branch, an outlet pipe from the generator connected to the first-mentioned pipe and having a shut-off valve, and a service pipe connected to said outlet pipe between the valve thereof and the connection between said pipe and the first-mentioned pipe.

2. In an acetylene gas apparatus, a generator, a gas-holder of the tank and bell type, a pipe having an outlet connection with the bell of the holder, and said pipe having a branch extending into the holder and into the sealing medium thereof, a valve in the first-mentioned pipe between the outlet connection and the branch, an outlet pipe from the generator and having a shut-off valve, a flexible hose connecting the outlet pipe to the first-mentioned pipe, and a service pipe connected to the outlet pipe between the valve thereof and the connection between said pipe and the flexible hose.

In testimony whereof I affix my signature in presence of two witnesses.

ANDREW MOSER.

Witnesses:
C. L. MORRISON,
J. H. CATRON, Jr.